United States Patent [19]

Ohdaira et al.

[11] Patent Number: 5,018,828

[45] Date of Patent: May 28, 1991

[54] OPTICAL FIBER

[75] Inventors: Akio Ohdaira, Iwakuni; Shunji Abe, Tokyo; Noboru Wakatsuki; Akira Tanaka, both of Kawasaki, all of Japan

[73] Assignees: Mitsui Petrochemcial Industries, Ltd., Tokyo; Fujitsu Limited, Kawasaki, both of Japan

[21] Appl. No.: 318,425

[22] Filed: Mar. 1, 1989

Related U.S. Application Data

[62] Division of Ser. No. 3,321, Jan. 14, 1987, abandoned.

[30] Foreign Application Priority Data

Feb. 24, 1986 [JP] Japan .................. 61-37245

[51] Int. Cl.$^5$ ............... B32B 9/00; G02B 6/00
[52] U.S. Cl. ............... 350/96.34; 350/96.29; 428/373; 428/375; 428/392
[58] Field of Search ............. 428/373, 375, 392; 350/96.34, 96.29

[56] References Cited

U.S. PATENT DOCUMENTS

| | | | |
|---|---|---|---|
| 3,740,113 | 6/1973 | Cass | 350/96.34 |
| 3,953,655 | 4/1976 | Steinkamp et al. | 525/285 X |
| 3,999,834 | 12/1976 | Ohtomo et al. | 350/96.34 |
| 4,693,553 | 9/1987 | Sasaki et al. | 350/96.34 |
| 4,762,878 | 8/1988 | Takeda et al. | 524/490 |

FOREIGN PATENT DOCUMENTS 0153414  3/1986  European Pat. Off. .

OTHER PUBLICATIONS

Patent Abstracts of Japan, vol. 9, No. 74 (C-273) [1979], Apr. 3, 1985; & JP-A-59 207 951 (Mitsui Sekiyu K.K.) 26-11-1984.
Patent Abstracts of Japan, vol. 9, No. 41 (C-267) [1764], Feb. 21, 1985; & JP-A-59 184 272 (Nippon Denshin Denwa Kosha) 19-10-1984.
Patent Abstract of Japan, vol. 9, No. 59 (C-270) [1782], Mar. 15, 1985; & JP-A-59 197 477 (Nippon Denshin Denwa Kosha), 09-11-1984.

*Primary Examiner*—Lorraine T. Kendell
*Attorney, Agent, or Firm*—Cushman, Darby & Cushman

[57] ABSTRACT

An optical fiber of heat resistance, low-temperature resistance, flexural resistance, water absorption resistance, chemical resistance, etc., is provided by comprising a composition in which a core component comprises a polycarbonate or a silica type glass, a clad component comprises a graft-modified poly (4-methyl-1-pentene).

12 Claims, No Drawings

OPTICAL FIBER

This is a division of application Ser. No. 07/003,321, filed Jan. 14, 1987, which was abandoned upon the filing hereof.

BACKGROUND OF THE INVENTION

1. Field of the Invention

The present invention relates to an optical fiber for transmitting optical signals, particularly to an optical fiber having an excellent heat resistance and flexural resistance.

2. Description of the Related Art

In the prior art for the plastic optical fibers, polystyrene (PS) or polymethyl-methacrylate (PMMA) are used as the core material. However, since such materials have a glass transition temperature (Tg) as low as 100° C., the core material will be softened and become fluid in a high temperature atmosphere of 100° C. or higher, and therefore, the upper limit of the usable temperature is about 80° C.

As a method for improving such a disadvantage, various plastic optical fibers using a polycarbonate having excellent transparency and a high Tg of about 150° C. have been mentioned (for example, U.S. Pat No. 3,999,834, Japanese Unexamined Patent Publication (Kokai) No. 57-46204 and Japanese Unexamined Patent Publication (Kokai) No. 60-32004). However, according to the method disclosed in U.S. Pat. No. 3,999,834, crosslinking treatment of the clad material is required after the polycarbonate is coated with the clad material, and therefore, a disadvantage is involved in that the preparation process is cumbersome and also a long time is required for the treatment. On the other hand, Japanese Unexamined Patent Publication (Kokai) No. 57-46204 discloses a plastic optical fiber having a polycarbonate coated with a clad material comprising polymethylmethacrylate and so on. However, these clad materials are not sufficient for heat resistance comparing to polycarbonate. And Japanese Unexamined Patent Publication (Kokai) No. 60-32004 discloses a plastic optical fiber having a core material comprising a polycarbonate coated with a clad material comprising 4-methyl-1-pentene, and further, that an unsaturated carboxylic acid such as acrylic acid may be copolymerized for improvement of the interlayer peel-off strength between the polycarbonate and the clad material. Due to poor adhesion between poly (4-methyl-1-pentene) and polycarbonate, a flexural resistance thereof as an optical fiber is inferior and the adhesiveness cannot be improved in some cases by mere copolymerization with an unsaturated carboxylic acid. Thus, under the present situation, an optical fiber having an excellent heat resistance and flexural resistance has not been practically realized.

SUMMARY OF THE INVENTION

Accordingly, the present invention provides an optical fiber having an excellent heat resistance, low-temperature resistance, flexural resistance, water absorption resistance, chemical resistance, etc., comprising a composition in which:

(a) a core component comprises a poly-carbonate or a silica type glass, (b) a clad component comprises at least 0.1% by weight, and preferably at least 0.5% by weight, of a graft-modified poly (4-methyl-1 pentene) (A) which is partially or entirely graft-modified with an unsaturated carboxylic acid or its derivative at a grafted amount within the range of from 0.01 to 10% by weight, is formulated, which graft-modified poly-4-methyl-1-pentene (A) may be further formulated with a low molecular weight compound (B) having a number-average molecular weight of 300 to 5,000.

DESCRIPTION OF THE PREFERRED EMBODIMENT

The polycarbonate comprising the core of the present invention (hereinafter abbreviated as PC) (A) includes various polycarbonates and copolycarbonates obtained by the reactions of dihydroxyl compounds with phosgen or diphenylcarbonate according to known methods. Examples of the dihydroxyl compounds include hydroquinone, rezorcinol, 4,4'-dihydroxy-diphenylmethane, 4,4'-dihydroxy-diphenyl-ethane, 4,4'dihydroxy-diphenyl-n-butane, 4,4'-dihydroxy-diphenylheptane, 4,4'-dihydroxy-diphenyl-phenyl-methane, 4,4'-dihydroxy-diphenyl-2,2-propane (bisphenol A), 4,4'-dihydroxy-3,3'-dimethyl-diphenyl-2,2-propane, 4,4'-dihydroxy-3,3'-diphenyl-diphenyl-2,2-propane, 4,4'-dihydroxy-dichloro-diphenyl-2,2-propane, 4,4'-dihydroxy-diphenyl-1,1-cyclopentane, 4,4'-dihydroxy-diphenyl-1,1-cyclohexane, 4,4'-dihydroxydiphenyl-methyl-phenyl-methane, 4,4'-dihydroxydiphenyl-ethyl-phenyl-methane, 4,4'-dihydroxydiphenyl-2,2,2-trichloro-1,1-ethane, 2,2'-dihydroxydiphenyl, 2,6-dihydroxynaphthalene, 4,4'-dihydroxydiphenyl ether, 4,4'-dihydroxy-3,3'-dichloro-diphenyl ether, and 4,4'-dihydroxy-2,5-diethoxyphenyl ether. Among these polycarbonates, those having a Tg of 140° C. or higher are preferred with respect to heat resistance. Particularly, polycarbonates by use of 4,4'-dihydroxydiphenyl-2,2-propane (bisphenol A) having a viscosity-average molecular weight within the range from 1.4 to $2.5 \times 10^4$ are preferred because they have a most excellent transparency, mechanical performance, heat resistance, low-temperature resistance, and impact resistance.

The silica type glass comprising the core according to the present invention comprises $SiO_2$ as the main component, and generally also contains such components as, for example, Ge, P, C., and Al, for control of the refractive index.

The graft-modified poly (4-methyl-1-pentene) (A) comprising the clad of the present invention has a grafted amount of an unsaturated carboxylic acid or its derivative within the range of from 0.01 to 10% by weight, preferably from 0.05 to 5% by weight having generally an intrinsic viscosity [η] of 0.3 to 10 dl/g, preferably 0.5 to 5 dl/g, in decalin solvent at 135° C. When a graft polymer with a grafted amount of the unsaturated carboxylic acid or its derivative less than 0.01% by weight is used, the interlayer adhesiveness with the polycarbonate or the quartz, which is the core cannot be improved. On the other hand, a graft polymer with a grafted amount exceeding 10% by weight will have a lower water absorption resistance and transparency.

The poly (4-methyl-1-pentene) (E), which is the base material for the graft-modified poly (4-methyl-1-pentene) (A) to be used in the present invention, is a homopolymer of 4-methyl-1-pentene or a copolymer of 4-methyl-1-pentene with an α-olefin having 2 to 20 carbon atoms such as ethylene, propylene, 1-butene, 1-hexene, 1-octene, 1-decene, 1-tetradecene, 1-octadecene, and the like, which is generally a polymer composed mainly of 4-methyl-1-pentene containing 85 mol% or more of 4-methyl-1-pentene, preferably a crystalline polymer having a melting point (ASTM D 3418) of 230° C. or higher and an intrinsic viscosity [η] in decaline solvent at 135° C. of 0.5 to 25 (dl/g).

When the clad according to the present invention is comprised of a composition containing further a low molecular weight compound (B) having a number-average molecular weight ($\overline{Mn}$) of 300 to 5,000, preferably 300 to 2,000 formulated in the above graft-modified poly (4-methyl-1-pentene) (A) in an amount generally of 1 to 15% by weight, further 2 to 10% by weight, based on 100 parts by weight of the composition, adhesiveness with the above core, interface smoothness, flexural resistance, low-temperature resistance, and the like can be further preferably improved. At a level less than 1% by weight of the low molecular weight compound (B) formulated, a further improved effect of the above characteristics cannot be exhibited, while at a level exceeding 15% by weight, heat resistance of the composition may be lowered or the low molecular weight compound (B) may seep out onto the interface to make it sticky. A compound having an $\overline{Mn}$ of less than 300 tends to seep out onto the surface and not give an improved effect of flexural resistance and low-temperature resistance. On the other hand, a compound having a $\overline{Mn}$ in excess of 5,000 tends not to give an improved effect of flexural resistance and low-temperature resistance.

Specific examples of the low molecular weight compound having an $\overline{Mn}$ of 300 to 5000 to be formulated in the graft-modified poly (4-methyl-1-pentene) (A) include, for example, mineral oils such as paraffinic process oils, naphthenic process oils, aromatic process oils, and the like, aliphatic hydrocarbon compounds such as paraffinic waxes, low molecular weight polymers obtained by polymerization (copolymerization) of α-olefins such as ethylene, propylene, 1-butene, and the like, alicyclic hydrocarbon compounds, aromatic hydrocarbons, fatty acids, aliphatic alcohols, fatty acid amides, fatty acid esters, aliphatic mercaptans, aliphatic aldehydes, aliphatic ketones, aromatic ethers, and the like, having 1 or more functional groups such as carboxylic group, hyroxyl group, carbamoyl group, ester group, mercapto group, carbonyl group, and the like, at the terminal ends or internally of aliphatic, alicyclic or aromatic hydrocarbon groups.

Of these low molecular weight compounds (B), aliphatic hydrocarbon compounds and alicyclic hydrocarbon compounds are preferable because of their excellent dispersibility in the above graft-modified poly (4-methyl-1-pentene) (A). Particularly, ethylene-α-olefin random copolymers (C) having an ethylene content of 10 to 95 mol%, preferably 40 to 92 mol%, a crystallinity by X-ray of 0 to 20%, a number-average molecular weight ($\overline{Mn}$) of 300 to 5000, preferably 300 to 2000, preferably a ratio of weight average molecular weight ($\overline{Mw}$) to $\overline{Mn}$ exhibiting the molecular weight distribution $\overline{Mw}/\overline{Mn}$ of 3 or less, further 2 or less and/or oligomers (D) represented by the formula:

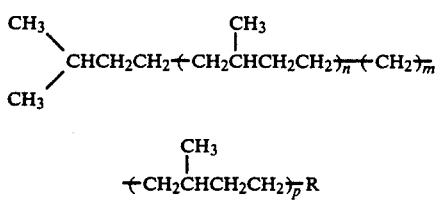

(wherein n and p are integers of 0 or more, m is 0 or 1,

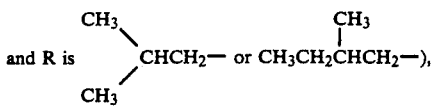

having an $\overline{Mn}$ of 300 to 5,000, further 300 to 2,000, preferably $\overline{Mw}/\overline{Mn}$ of 3 or less, further 2 or less, are preferred, because they have a most excellent dispersibility in the above graft-modified poly (4-methyl-1-pentene) (A) and have excellent improved effects such as interlayer adhesiveness, flexural resistance, low-temperature resistance, and the like.

In the above-mentioned ethylene-α-olefin random copolymer (C), the α-olefin to be copolymerized with ethylene generally includes α-olefins having 3 to 20 carbon atoms, specifically, for example, propylene, 1-butene, 1-hexene, 4-methyl-1-pentene, 1-octene, 1-decene, 1-tetradecene, 1-octadecene and the like, which may comprise each individual compound or a mixture of two or more compounds.

According to one method for producing the above-mentioned ethylene-α-olefin random copolymer (C), ethylene and an o-olefin are continuously copolymerized in liquid phase by using a catalyst formed from a soluble vanadium compound and an organic aluminum compound in the presence of hydrogen, wherein the vanadium compound concentration in the polymerization system is 0.3 mmols or more per liter of the liquid phase, and the vanadium compound supplied to the polymerization medium to 5-fold or less of the vanadium compound concentration in the polymerization system. A more detailed method is described in Japanese Unexamined Patent Publication (Kokai) No. 57-123205.

As the oligomer (D) represented by the formula:

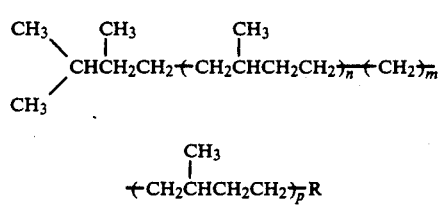

When m is 0 and R is

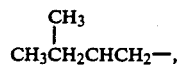

is a hydrogenated product of polyisoprene. For obtaining a hydrogenated product of polyisoprene, it can be easily produced by carrying out anion polymerization of isoprene in a cyclohexane solution under the copresence of sec-butyl lithium catalyst and then hydrogenating the polymer in the presence of a nickel naphthenate catalyst. On the other hand, when m is 1, n and pare 2, and R is

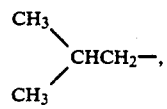

it is squalane obtained by hydrogenation of squalene with a nickel catalyst. Squalene which is a starting material of squalane is contained in liver oil of a deep sea shark, and it can be obtained by subjecting the unsaponified product of shark liver oil to fractional distillation, deacidification and further to fractional distillation in the presence of metallic sodium, or condensing farnesyl chloride or farnesyl bromide in the presence of metallic magnesium, or carrying out Wittig reaction on transgeraniol acetone.

In the above description, the ethylene content was measured according to the so-called $^{13}$C-NMR method, the melting point was measured according to ASTM D 3418, the crystallinity was measured according to the X-ray diffraction method and $\overline{Mn}$ and $\overline{Mw}/\overline{Mn}$ was measured according to gel permeation chromatography (GPC) by using tetrahydrofuran as the solvent and polystyrene of a known molecular weight and squalane as the standard substances at 25° C.

The unsaturated carboxylic acid or its derivative to be grafted onto the above poly (4-methyl-1-pentene) (E) to be used in the present invention may include unsaturated carboxylic acids such as acrylic acid, maleic acid, fumaric acid, tetrahydrophthalic acid, itaconic acid, citraconic acid, chrotonic acid, isocrotonic acid, Nagic Acid ® (endo-cis-bicyclo [2,2,1] hept-5-one-2,3-dicarboxylic acid) and the like, or their derivatives such as acid halides, amides, imides, anhydrides, esters, and the like. Specific examples may include maleyl chloride, maleimide, maleic anhydride, citraconic anhydride, monomethylmaleate, dimethylmaleate, glycidylmaleate, and the like. Among them, unsaturated dicarboxylic acids or acid anhydrides thereof are preferred, particularly maleic acid, Nagic Acid ® or acid anhydrides thereof are preferred.

For preparation of a modified product by graft copolymerizing a graft monomer selected from the abovementioned unsaturated carboxylic acids or derivatives thereof with the above poly (4-methyl-1-pentene) (E), various methods known in the art may be employed. For example, there may be employed the method in which graft copolymerization is carried out by melting the poly (4-methyl-1-pentene) (E) and adding a graft monomer thereto or the method in which graft copolymerization is carried out by adding a graft monomer to a solution of the polymer dissolved in a solvent. In either case, for efficient graft copolymerization is carried out by adding a graft monomer to a solution of the polymer dissolved in a solvent. In either case, for efficient graft copolymerization of the abovementioned graft monomer, it is preferable to practice the reaction in the presence of a radical initiator. The graft reaction is carried out generally at a temperature of from 60° to 350° C. The amount of the radical initiator to be used is generally within the range of from 0.001 to 1 part by weight per 100 parts by weight of the poly (4-methyl-1-pentene) (E). The radical initiator may include organic peroxides, organic peresters, and otherwise azo compounds. Of these radical initiators, dialkyl peroxides such as dicumyl peroxide, di-tert-butyl peroxide, 2,5-dimethyl-2,5-di(tert-butyl-peroxy) hexyne-3, 2,5-dimethyl-2,5-di(tert-butyl-peroxy(hexane), 1,4-bis (tert-butylperoxy-isopropyl)benzene, and the like are preferred.

The graft-modified poly (4-methyl-1-pentene) (A) comprising the clad of the present invention may be either entirely graft-modified with an unsaturated carboxylic acid, and the like, or a mixture of an entirely graft-modified poly (4-methyl-1-pentene) and an unmodified poly (4-methyl-1-pentene) (E) {namely a graft modified poly(4-methyl-1-pentene} which is partially modified), provided that the grafted amount of the unsaturated carboxylic acid or its derivative is within the range as specified above. When mixed with an unmodified poly (4-methyl-1-pentene) (E), (namely a graft modified poly (4-methyl-1-pentene) and an unmodified poly (4-methyl-1-pentene) which is partially modified), provided that the grafted amount of the unsaturated carboxylic acid or its derivative is within the range as specified above. When mixed with an unmodified poly (4-methyl-1-pentene) (E), it is also possible to use a graft-modified poly (4-methyl-1-pentene) containing a slightly higher concentration of graft content generally up to 25% by weight, provided that the grafted amount of the unsaturated carboxylic acid, etc. in the mixture falls within the range as specified above.

The composition in which the low molecular compound (B) is formulated in the graft-modified poly (4-methyl-1-pentene) (A), which is one of the clad materials of the present invention, may be either a composition in which the low molecular weight compound (B) is added to the modified poly (4-methyl-1-pentene) (A) previously graft-modified with an unsaturated carboxylic acid and the like or a composition which is graft-modified with the above-mentioned unsaturated carboxylic acid and the like, during mixing or after mixing of an unmodified poly (4-methyl-1-pentene) (E) with the low molecular compound (B).

The optical fiber according to the present invention may be coated with, for example, a thermoplastic resin comprising polypropylene or polyethylene as the main component which has an improved heat resistance by intramolecular crosslinking thereof, outside the clad comprising the above graft-modified poly (4-methyl-1-pentene) (A) as the constituent for protection of the clad material. Further, to prevent external disturbing light from outside, the coating material may be colored with a pigment, or a flame retardant may be added therein to improve the flame retardancy.

The optical fiber according to the present invention can be prepared according to various methods known in the art, specifically according to, for example, the method in which the core material and the clad material are extruded simultaneously by the melt composite spinning method comprising a double nozzle with the core material as the core component and the clad material being covered to a thickness of 5 to 50 μm at the outer circumferential portion, the method in which the core material is first molded by extrusion and thereafter the clad material is covered by extrusion or the method in which the core material is molded and then a clad material dissolved in a solvent is coated thereon, followed by, for example, drying. When a polycarbonate is used as the core material, the temperature at the double nozzle portion is controlled generally between 220° and 250° C.

The optical fiber according to the present invention comprising a core comprising a polycarbonate or a silica and a clad mainly comprising of the graft-modified poly (4-methyl-1-pentene) has an excellent heat resistance and low-temperature resistance and the polycarbonate core optical fiber also has an excellent flexural resistance, and therefore, it can be preferably used as a sensor for an optical data link in the engine room of an automobile or for detection of a material for a molding machine for which heat resistance is demanded.

Also, since the quartz glass type optical fiber has an excellent light transmittance, it can be preferably used for optical transmission and optical LAN between private instruments/instruments in a factory.

EXAMPLES

The present invention is described in more detail by referring to the following Examples, but the present invention is not limited by these Examples within the spirit of the invention.

EXAMPLE 1

Preparation of maleic anhydride graft-modified poly (4-methyl-1-pentene)

After mixing 0.7 part by weight of maleic anhydride and 0.5 part by weight of 2,5-dimethyl-2,5-di(tert-butylperoxy)hexyne-3 with 100 parts by weight of a poly(4-methyl-1-pentene) (hereinafter abbreviated as PMP-1) having an intrinsic viscosity $[\eta]$: 3.3 dl/g, Tm=233° C. and containing 6 mol% of 1-hexadecene/1-octadecene (weight ratio 1/1) by a Henschel mixer, the mixture was melted and mixed through an extruder set at a temperature of 260° C. to obtain a maleic anhydride graft-modified poly (4-methyl-1-pentene) (hereinafter abbreviated as MAH-PMP-1) having an intrinsic viscosity $[\eta]$: 1.4 dl/g and a grafted amount of maleic anhydride: 0.5 g/100 g polymer.

Preparation of optical fiber

After mixing 96% by weight of the above MAH-PMP-1 and 4% by weight of squalane by a Henschel mixer, the mixture was melted and kneaded through an extruder (molding temperature: 250° C.) to obtain a composition-I for clad. Subsequently, a polycarbonate (optical grade having a viscosity-average molecular weight of 2.0 to $2.2 \times 10^4$) was separately melted through an extruder (molding temperature: 240° C.) and then supplied to a double nozzle die, and the composition-I melted through another extruder (molding temperature: 250° C.) was supplied to the above-mentioned die to obtain an optical fiber-I with a core diameter of 1,000 µm and a clad thickness of 50 µm. The optical fiber obtained was evaluated according to the methods described below.

Light transmission loss: By passing a current of 30 mA through LED with the maximum emission wavelength of 660 nm (FH-511, produced by Stanray), light was emitted from an LED, the optical fibers with lengths of 11 m and 10 m were connected by means of connectors on one side to the LED side and the output energy from the other end was measured by means of an optical power meter, and the difference in outputted light between 11 m and 10 m is represented as the light transmission loss per 1 m (dB/m).

Heat resistance test: An optical fiber of 10 m is inserted into a thermostatic bath of 130° C., with the both ends of the optical fiber being taken out into the outer atmosphere from the thermostatic bath, and the change in light transmission loss was measured by use of an LED and optical power meter used as in the measurement of the above light transmission loss to determine the value after the elapse of 1,000 hours.

Flexural resistance test: The optical fiber was flexed at ±180° with a radius of curvature of 5 mm, and the changed amount of light transmission loss after repeating this for 1,000 cycles was measured.

The results are shown in Table 1.

EXAMPLE 2

Example 1 was repeated except that a composition-II for clad comprising 2% by weight of a maleic anhydride graft-modified poly (4-methyl-1-pentene) obtained in the same manner as in Example 1 having an intrinsic viscosity $[\eta]$: 1.0 dl/g, Tm: 233° C., containing 6 mol% of 1-hexadecene/1-octadecene (weight ratio 1/1) and having a grafted amount of maleic anhydride of 1.2 g/100 g polymer, 4% by weight of squalane and 94% by weight of a poly(4-methyl-1-pentene) having an intrinsic viscosity $[\eta]$: 2.4 dl/g and containing 6 mol% of 1-hexadecene/1-octadecene (weight ratio 1/1) (hereinafter abbreviated as PMP-2) was used in lieu of the composition-I used in Example 1 to obtain an optical fiber II with a core diameter of 1,000 µm and a clad thickness of 50 µm. The optical fiber II obtained was evaluated according to the methods as described in Example 1. The results are shown in Table 1.

EXAMPLE 3

Example 1 was repeated except that a composition-III (grafted amount of maleic anhydride: 0.5 g/100 g polymer) obtained by mixing 96% by weight of PMP-1 and 4% by weight of squalane and 0.7 parts by weight of maleic anhydride and 0.05 parts by weight of 2,5-dimethyl-2,5-di(tert-butylperoxy)hexyne-3 (Perhexyne 25B, produced by Nippon Yushi) based on 100 parts of PMP-1+squalane by a Henschel mixer and thereafter melt mixing the mixture through an extruder set at a temperature of 260° C. was used in lieu of the composition-I used in Example 1 to obtain an optical fiber III with a core diameter of 1,000 µm and a clad thickness of 50 µm. The evaluation results are shown in Table 1.

EXAMPLE 4

Example 3 was repeated except for using an ethylene-propylene random copolymer (ethylene content 55 mol%, $\overline{M}w/\overline{M}n$: 1.4 and the crystallinity: 0%) having a $\overline{M}n$ of 350 in place of squalane used in Example 3. The results are shown in Table 1.

EXAMPLE 5

Example 1 was repeated except that the MAH-PMP-1 obtained in Example 1 alone (i.e. without added squalane) was used in place of the composition-I used in Example 1. The results are shown in Table 1.

COMPARATIVE EXAMPLE 1

Example 1 was repeated except that composition-IV having an intrinsic viscosity $[\eta]$ of 2.0 dl/g obtained by mixing 96% by weight of PMP 2 and 4% by weight of squalane by a Henschel mixer was used and then melt mixing the mixture through an extruder set at a temperature of 260° C. was melt mixed in lieu of the composition-I obtained in Example 1. The results are shown in Table 1.

COMPARATIVE EXAMPLE 2

Comparative example 1 was repeated except that the PMP-1 used in Comparative Example 1 was used alone. The results are shown in Table 1.

TABLE 1

|  | Light transmission loss (dB/m) | | Change of light transmission loss (dB/m) |
| --- | --- | --- | --- |
|  | Initial | Heat resistance | Flexural resistance |
| Example 1 | 1.0 | 2.0 | 0.2 |
| Example 2 | 1.05 | 1.8 | 0.2 |
| Example 3 | 1.0 | 1.5 | 0.2 |
| Example 4 | 1.1 | 1.6 | 0.2 |
| Example 5 | 1.0 | 2.0 | 0.4 |
| Comparative Example 1 | 1.15 | 8.0 | 0.8 |
| Comparative Example 2 | 1.2 | 6.5 | 1.4 |

EXAMPLE 6

Silica preform fused in an electric over was formed into fibers at a speed of 30 m/min to obtain a quartz core. The composition used in Example 1 was heated and melted at a molding temperature of 250° C. in an extruder and the molten composition was coated on the outer periphery of the silica core. Thus, optical fiber VIII having a core diameter of 200 μm and a clad thickness of 100 μm was obtained.

The optical fiber VIII obtained above was evaluated in the same manner as in Example 1. As a result, the initial light transmission loss was 48 dB/km at a wavelength of 660 nm, the light transmission loss after the heat resistance test was 50 dB/km, and the light transmission loss after flexural resistance test was 52 dB/km.

We claim:

1. An optical fiber comprising:
   (a) a core component comprising a polycarbonate or a silica type glass; and
   (b) a clad component comprising at least 0.1% by weight of a composition composed of a graft-modified poly (4-methyl-1-pentene) (A) which is partially or entirely graft-modified with an unsaturated carboxylic acid or its derivative at a grafted amount within the range of from 0.1 to 10% by weight and 1 to 15% by weight, based on 100 parts by weight of said composition, of a low molecular weight compound having a number-average molecular weight of 300 to 5,000.

2. An optical fiber according to claim 1 wherein the low molecular weight compound is an aliphatic hydrocarbon compound.

3. An optical fiber according to claim 1 wherein the low molecular weight compound is an alicyclic hydrocarbon compound.

4. An optical fiber according to claim 2 wherein the aliphatic hydrocarbon compound is an ethylene-α-olefin random copolymer.

5. An optical fiber according to claim 4 wherein the ethylene-α-olefin random copolymer has an ethylene content of 10 to 95 mol%, a crystallinity by X-ray of 0 to 20% and a molecular weight distribution of 3 or less.

6. An optical fiber according to claim 2 wherein the aliphatic hydrocarbon compound is an oligomer (D) represented by the formula:

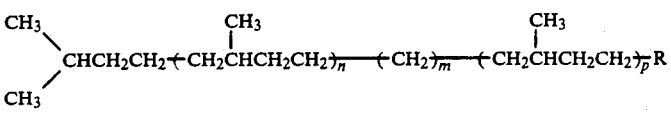

wherein n and p are integers of 0 or more, m is 0 or 1, and R is:

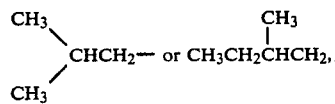

having a molecular distribution of 3 or less.

7. An optical fiber according to claim 6 wherein the oligomer is a hydrogenated product of polyisoprene.

8. An optical fiber according to claim 6 wherein the oligomer is a squalene.

9. An optical fiber according to claim 1 wherein the unsaturated carboxylic acid or its derivative is an unsaturated dicarboxylic acid or an acid anhydride.

10. An optical fiber according to claim 9 wherein the unsaturated dicarboxylic acid is maleic acid.

11. An optical fiber according to claim 9 wherein the unsaturated carboxylic acid anhydide is maleic anhydride.

12. An optical fiber according to claim 1 wherein the said clad component comprises at least 0.5% by weight of said graft-modified poly(4-methyl-1-pentene)(A).

* * * * *